(12) United States Patent
Goldberg et al.

(10) Patent No.: US 10,049,117 B2
(45) Date of Patent: Aug. 14, 2018

(54) DEFRAGMENTATION-LESS DEDUPLICATION

(71) Applicant: INTERNATIONAL BUSINESS MACHINES CORPORATION, Armonk, NY (US)

(72) Inventors: Itzhack Goldberg, Hadera (IL); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 14/025,583

(22) Filed: Sep. 12, 2013

(65) Prior Publication Data

US 2015/0074064 A1 Mar. 12, 2015

(51) Int. Cl.
*G06F 17/30* (2006.01)

(52) U.S. Cl.
CPC .. *G06F 17/30156* (2013.01); *G06F 17/30135* (2013.01)

(58) Field of Classification Search
CPC ......... G06F 17/30067; G06F 17/30215; G06F 17/30; G06F 12/00
USPC ................................................ 707/610, 822
See application file for complete search history.

(56) References Cited

U.S. PATENT DOCUMENTS

| 7,136,885 | B2* | 11/2006 | Wright et al. | |
|---|---|---|---|---|
| 8,200,722 | B2* | 6/2012 | Grubbs et al. | 707/822 |
| 2006/0085471 | A1* | 4/2006 | Rajan | G06F 3/0608 |
| 2010/0082672 | A1* | 4/2010 | Kottomtharayil | G06F 11/1451 707/770 |
| 2011/0071989 | A1* | 3/2011 | Wilson | G06F 17/30156 707/692 |
| 2012/0072401 | A1* | 3/2012 | Johri | G06F 17/30241 707/705 |
| 2013/0073519 | A1* | 3/2013 | Lewis et al. | 707/610 |
| 2014/0195571 | A1* | 7/2014 | Wang | G06F 17/30132 707/823 |

OTHER PUBLICATIONS

Johnathan Corbet, Punching holes in files, Nov. 17 2010, https://lwn.net/Articles/415889/.*
Fallocate—manipulate file space, http://manpages.courier-mta.org/htmlman2/fallocate.2.html.*
Title: RevDedup: A Reverse Deduplication Storage System Optimized for Reads to Latest Backups Author: Chun-Ho Ng and Patrick P. C. Lee Source: The Chinese University of Hong Kong, Hong Kong Technical Report Publisher: Arxiv Publication date: Feb. 17, 2013.

* cited by examiner

*Primary Examiner* — Hung Q Pham
(74) *Attorney, Agent, or Firm* — Griffiths & Seaton PLLC

(57) ABSTRACT

For defragmentation-less deduplication using a processor device, holes are punched in a file in a data deduplication process for avoiding the use of defragmenting by allowing a file system to use the punched holes for reclaiming the free space for adding to a free space pool of the file system.

17 Claims, 7 Drawing Sheets

500

```
debugfs ~itzhack/dev/ext4
debugfs 1.41.12 (17-May-2010)
debugfs: show_inode_info 1Gaba
Inode: 19   Type: regular    Mode: 0644   Flags: 0x80000
Generation: 632686292    Version: 0x00000000:00000001
User:     0   Group:     0   Size: 1073745920
File ACL: 0   Directory ACL: 0
Links: 1   Blockcount: 2097168
Fragment:   Address: 0   Number: 0   Size: 0
 ctime: 0x51305430:0504e720 -- Fri Mar  1 09:09:44 2013
 atime: 0x5131b099:ce446120 -- Sat Mar  2 09:53:45 2013
 mtime: 0x51305430:0504e720 -- Fri Mar  1 09:09:44 2013
crtime: 0x513053c9:40609620 -- Fri Mar  1 09:07:54 2013
Size of extra inode fields: 28
Extended attributes stored in inode body:
  selinux = "unconfined_u:object_r:file_t:s0\000" (32)
EXTENTS:
(0-32787): 1966080-1998847, (32768-65535): 1998848-2031615, (65536-98303): 2031616-206436
3, (98304-131071): 2064384-2097151, (131072-163839): 2129920-2162687, (163840-196607): 21
62688-2195455, (196608-229375): 2195456-2228223, (229376-262143): 2228224-2260991, (26214
4): 2260992
debugfs: ls -lia 1Gaba
19 -rw-r--r--  1 root root 1073745920 Mar  1 09:09 1Gaba
debugfs: ▌
```

```
[root@izik-centos-1 ext4_fs]# for i in 1 2 3 4 5 6; do echo 3 > /proc/sys/vm/drop_caches
; sleep 5 ; free -m; time cp --sparse=always 1Gaba 1Gaba.$(i); done
             total       used       free     shared    buffers     cached
Mem:          1879        268       1611          0          0         19
-/+ buffers/cache:        248       1631
Swap:         4031          0       4031 real    0m23.238s
user    0m0.818s
sys     0m1.697s
             total       used       free     shared    buffers     cached
Mem:          1879        558       1329          0          0        293
-/+ buffers/cache:        256       1623
Swap:         4031          0       4031 real    0m24.348s
user    0m0.611s
sys     0m1.739s
             total       used       free     shared    buffers     cached
Mem:          1879        592       1287          0          0        333
-/+ buffers/cache:        258       1621
Swap:         4031          0       4031 real    0m25.306s
user    0m0.818s
sys     0m1.733s
             total       used       free     shared    buffers     cached
Mem:          1879        579       1300          0          0        321
-/+ buffers/cache:        258       1621
Swap:         4031          0       4031 real    0m24.567s
user    0m0.818s
sys     0m1.712s
             total       used       free     shared    buffers     cached
Mem:          1879        572       1307          0          0        314
-/+ buffers/cache:        257       1621
Swap:         4031          0       4031 real    0m24.648s
user    0m0.809s
sys     0m1.738s
             total       used       free     shared    buffers     cached
Mem:          1879        564       1315          0          0        306
-/+ buffers/cache:        257       1622
Swap:         4031          0       4031
cp: writing `1Gaba.6': No space left on device real    0m17.899s
user    0m0.809s
sys     0m1.251s
[root@izik-centos-1 ext4_fs]#
```

```
[root@izik-centos-1 ext4_fs]# df -h .
Filesystem      Size  Used Avail Use% Mounted on
/dev/vdc         9.9G  9.4G  1.0M 100% /ext4_fs
[root@izik-centos-1 ext4_fs]# echo 3 > /proc/sys/vm/drop_caches ; free -m ; time cp --sparse=always 1Gaba 1Gaba.new6
              total        used        free      shared     buffers      cached
Mem:           1879         370        1609           0           0          21
-/+ buffers/cache:          248        1631
Swap:          4031           0        4031
cp: writing `1Gaba.new6': No space left on device real    0m14.070s
user    0m0.018s
sys     0m1.025s
[root@izik-centos-1 ext4_fs]# df -h .
Filesystem      Size  Used Avail Use% Mounted on
/dev/vdc         9.9G  9.9G     0 100% /ext4_fs
[root@izik-centos-1 ext4_fs]# rde
debugfs -itzhack/dev/ext4
debugfs 1.41.12 (17-May-2010)
debugfs:  show_inode_info 1Gaba.new6
Inode: 34   Type: regular    Mode:  0644   Flags: 0x80000
Generation: 1121835877    Version: 0x00000000:00000001
User:     0   Group:     0   Size: 537288704
File ACL: 0    Directory ACL: 0
Links: 1   Blockcount: 1049792
Fragment:  Address: 0    Number: 0    Size: 0
 ctime: 0x51336fcf:03fee4c0 -- Sun Mar  3 17:44:15 2013
 atime: 0x51336fc0:ed9d77c0 -- Sun Mar  3 17:44:00 2013
 mtime: 0x51336fcf:03fee4c0 -- Sun Mar  3 17:44:15 2013
crtime: 0x51336fc0:ed9d77c0 -- Sun Mar  3 17:44:00 2013
Size of extra inode fields: 28
Extended attributes stored in inode body:
  selinux = "unconfined_u:object_r:file_t:s0\000" (32)
EXTENTS:
(0-7): 262144-262151, (8-15): 262160-262167, (16-23): 262176-262183, (24-31): 262192-2621
99, (32-39): 262208-262215, (40-47): 262224-262231, (48-55): 262240-262247, (56-63): 2622
56-262263, (64-71): 262272-262279, (72-79): 262288-262295, (80-87): 262304-262311, (88-95
```

FIG. 7

DEFRAGMENTATION-LESS DEDUPLICATION

BACKGROUND OF THE INVENTION

Field of the Invention

The present invention relates in general to computers, and more particularly to defragmentation-less deduplication in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for defragmentation-less deduplication using at least one processor device in a computing environment. In one embodiment, by way of example only, holes are punched in a file in a data deduplication process for avoiding the use of defragmenting by allowing a file system to use the punched holes for reclaiming the hole space for adding to a free space pool of the file system.

In another embodiment, a computer system is provided for defragmentation-less deduplication using at least one processor device, in a computing environment. The computer system includes a computer-readable medium and a processor in operable communication with the computer-readable medium. In one embodiment, by way of example only, at least one of the processor devices punches holes in a file in a data deduplication process for avoiding the use of defragmenting by allowing a file system to use the punched holes for reclaiming the hole space for adding to a free space pool of the file system.

In a further embodiment, a computer program product is provided for defragmentation-less deduplication using at least one processor device, in a computing environment. The computer-readable storage medium (e.g., a non-transitory computer-readable storage medium) has computer-readable program code portions stored thereon. The computer-readable program code portions include a first executable portion that punches holes in a file in a data deduplication process for avoiding the use of defragmenting by allowing a file system to use the punched holes for reclaiming the hole space for adding to a free space pool of the file system.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 is a test result diagram illustrating an exemplary a 1 gigabyte (GB) file created on a new file system extent map using defragmentation-less deduplication in which aspects of the present invention may be realized;

FIG. 6 is a test result diagram illustrating additional exemplary six 1 gigabyte files created on an EXT4 file system extent map having only 5.2 gigabyte (GB) available using defragmentation-less deduplication in which aspects of the present invention may be realized; and FIG. 7 is a test result diagram illustrating additional exemplary 1 Gaba.new6 file created on an file system extent map filling the entire file system using defragmentation-less deduplication in which aspects of the present invention may be realized.

DETAILED DESCRIPTION OF THE DRAWINGS

Figure 1:
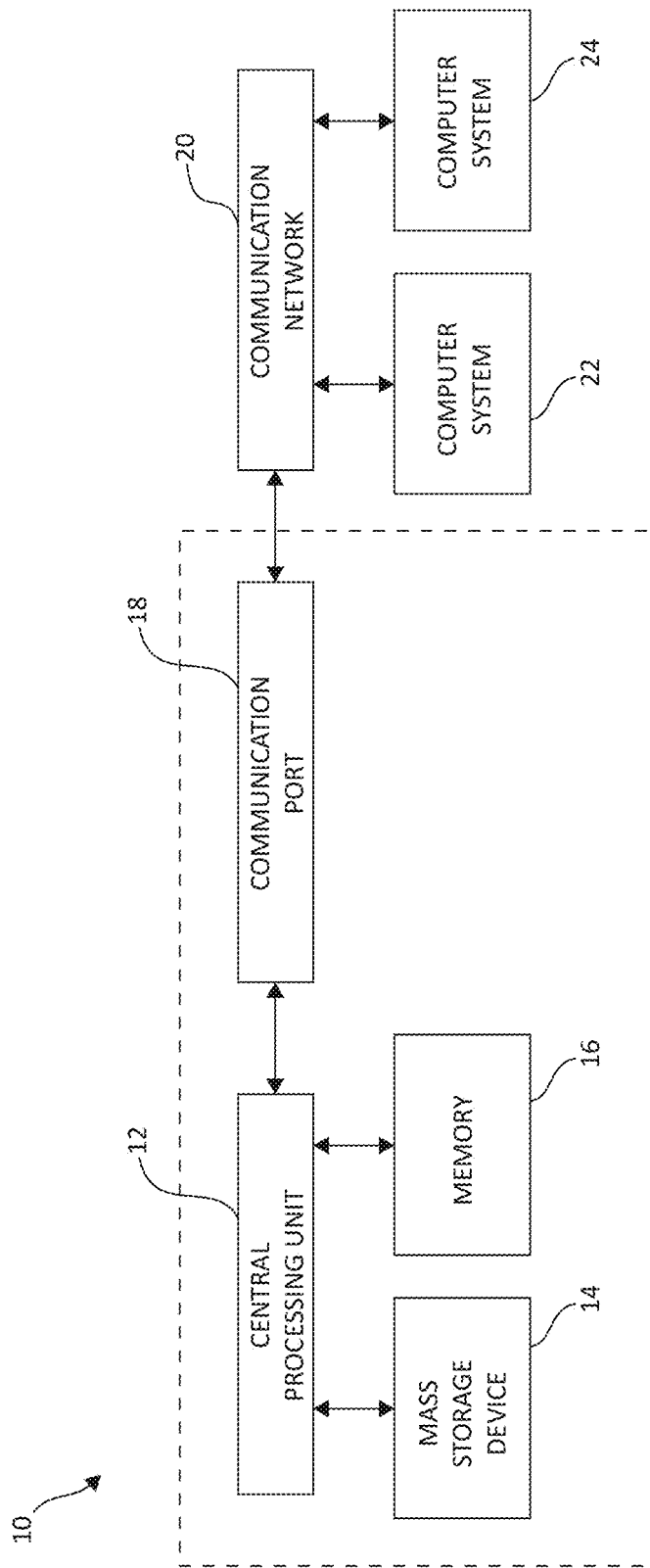
FIG. 1 is a block diagram illustrating a computing system environment having an example storage device in which aspects of the present invention may be realized.

As mentioned previously, large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Data entrusted to a deduplicating system often times is required to be exported and/or backed up to a different site. Currently, deduplication solutions are greatly dependent on defragmentation processes. In one embodiment, a defragmentation process is physically organizing the contents of the mass storage device used to store files into the smallest number of contiguous regions (fragments). It also attempts to create larger regions of free space using compaction to impede the return of fragmentation. Some defragmentation utilities try to keep smaller files within a single directory together, as they are often accessed in sequence. The reason why deduplication solutions greatly depend on defragmentation processes is that an initial fresh stream of data is processed and saved as one or more big chunks, and becomes fragmented overtime when some of the original pieces of the one big chunk are modified or deleted. The big chunks of data are simply static and/or preallocated big files. The static reservation of the whole space intent is to alleviate problems that seem to arise with dynamic allocation and deletion of files. The handling of the file's internal structures is beyond the file system (FS) capacity and, it is left to the deduplication appliance to manage. Defragging of a file is both central processing unit (CPU) and input/output (I/O) bound. Defragmenting requires intricate planning of what data chunks should be moved and where to, as well as physically moving those relevant pieces and, updating their respective references.

Thus the present invention provides a solution for defragmentation-less deduplication using at least one processor device in a computing environment. In one embodiment, by way of example only, holes are punched in a file in a data deduplication process for avoiding the use of defragmenting by allowing a file system to use the punched holes for the generation of adding to the free space. In other words, the file system does not generate free space but rather distribute/allocate the available free space to its clients. The present invention allows a file system (FS) to reclaim the holes/fragments space and add it to the file systems' free space pool.

In one embodiment, the defragment-less operation of the present invention is not restricted to VTL deduplication appliance alone, but in one embodiment a majority of the fragments are created in a backup VTL solution because each backup has a retention period after which it expires. Any expiration of backup data can introduce fragments that represent files' chunks that are not referenced anymore. It is less likely to find fragments in archive systems where data is retained for eternity. Also, it should be noted that even though a primary storage in not used herein as the storage location for the deduplication technique because there is too much of a toll in terms of performance hit, if and when deduplication is used for primary storage, then there too (e.g., in the primary storage) the issue of fragments can become an issue because of the respective files life span where old data is replaced by new and the "old" is not referenced anymore. Thus, the present invention does not limit the defragment-less to deduplication but, may apply to various scenarios where fragments are created.

In one embodiment, by way of example only, a hole is punched in a fragment of an existing, large fragmented file and returning the punch hole fragment to the free space of the file system. The punched-holes are returned to the FS free space. The ensuing file creation may be an independent phase and/or may not happen at a later time. Existing, large fragmented files are deleted after losing all data in the existing, large fragmented files for saving index node space. Each one of the punched holes is zeroed out. The punched holes point to a logical block address (LBA) zero. However, in one embodiment, there is no need to zero out the punched holes, but rather, when the space is allocated to a new/another file then the writing process overwrites the old data.

In one embodiment, by way of example only, the present invention retains an original size of a punched hole for converting a populated file into a sparsely populated file. A fallocate command is used for the hole punching. A new file is created from the punched holes during the data deduplication process. In one embodiment, the new file is created from the FS available free space that is made of some (originally) unfragmented space and, some fragmented ones that were returned to the FS through the hole-punching.

In one embodiment, the present invention punches holes in a file in a deduplicating appliance to avoid the use of a defragging by allowing the underlying FS to use the holes as-is and uses the hole punching as means of avoiding the use of defragging.

It should be noted that although a file is [logically] one long stream of bytes doesn't mean that its data is kept in contiguous blocks on the storage. In fact, for performance reasons, when storage is still confined to single disks, the FS is used to allocate the blocks across one cylinder to minimize the head movements. File Systems (FS) that are built around direct and indirect blocks are not as badly affected by fragments and should not have a negative impact on the access time. File Systems which are built around extents (such as EXT4 and GFS2) create files using a small number of large extents. In such, the impact of fragmentation has to be investigated and, is covered in the next paragraph.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 22, 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22, 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
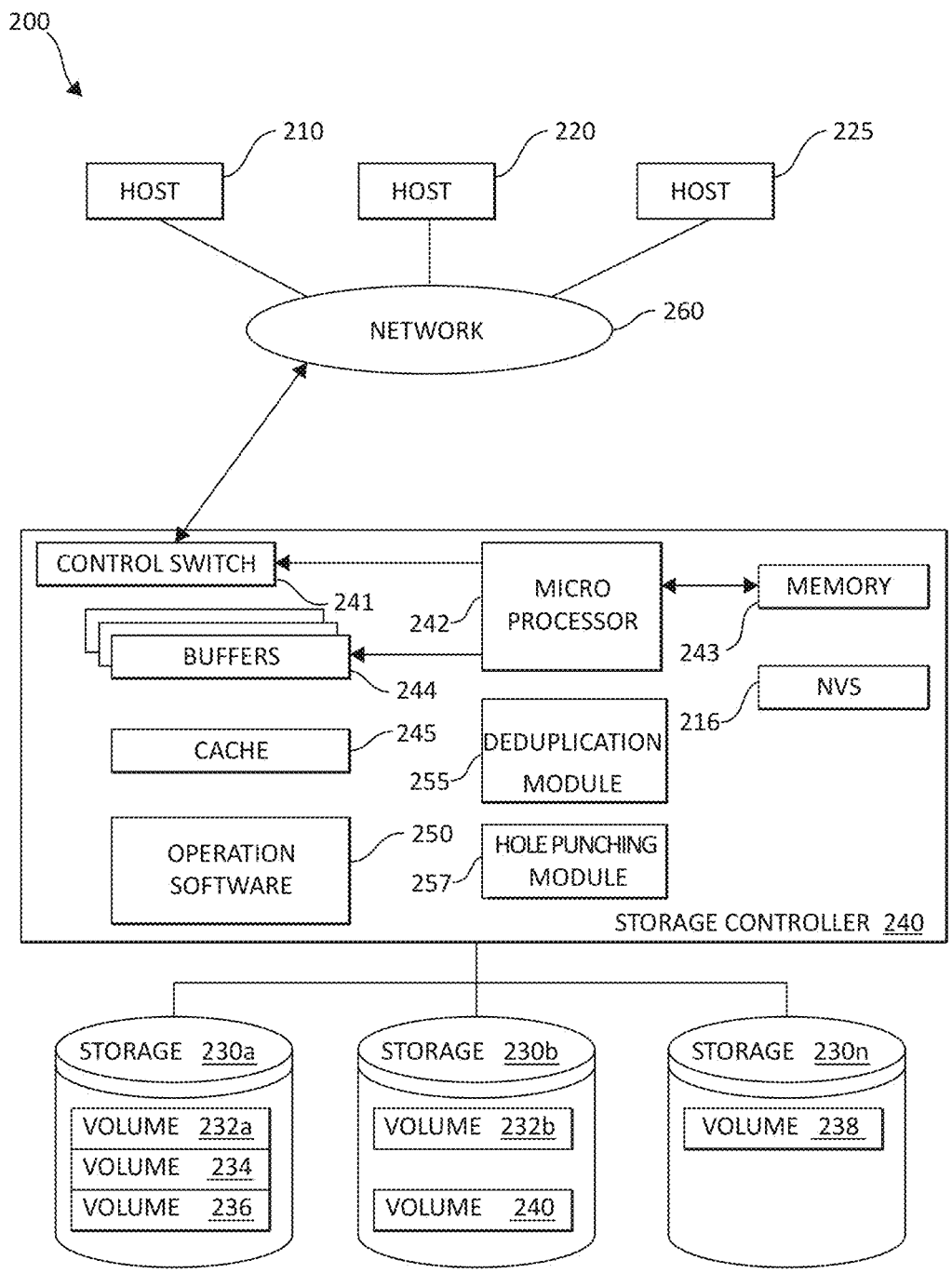
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255 and a hole punching module 257. The data duplication module 255 and the hole punching module 257 may work in conjunction with each and every component of the storage controller 240, the hosts 210, 220, 225, and storage devices 230. The data duplication module 255 and the hole punching module 257 may be structurally one complete module or may be associated and/or included with other individual modules. The data duplication module 255 and the hole punching module 257 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255 and/or the data segmenting module 257, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255 and the hole punching module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255 and the hole punching module 257 may also be located in the cache 245 or other components. As such, the data duplication module 255 and the hole punching module 257 maybe used as needed, based upon the storage architecture and users preferences.

In one embodiment, the present invention does move data blocks around in order to create larger contiguous areas but, instead the present invention punches holes in large, fragmented files (where the fragments were) and in doing so have those fragments returned to the FS free space, so that new, larger files may be created. Once the "old large" fragmented files lose all their data, they can be deleted in order to save inodes' space (as empty whole hole file consumes no space). Punching holes in a file is tantamount to converting a thickly populated file to a sparsely populated one. Every hole will in effect be logically zeroed out blocks (i.e., those holes will not consume disk space and all will be pointing to LBA zero that by convention means that the respective extent is filled with zeros.) In one embodiment, punching holes may be used and supported by various file systems (e.g., fourth extended (EXT4) file-system, XFS file-system, and/or B-tree file system (BTRFS). In one embodiment, the hole punching is implemented in a variety of deduplication processes and/or solutions.

In one embodiment, hole punching may be implemented by one or more file-systems, and has the potential to be implemented on alternative file systems (e.g., both BTRFS and EXT4), thus the present invention provides a generic way for applying to all file systems. In one embodiment, the present invention provides a generic way to apply to all file systems by adding a fallocate( ) command (e.g., FALLOC_FL_PUNCH_HOLE) to fallocate( ) since the fallocate( ) command already looks like the normal fallocate( ) operation (e.g., the fallocate command is used to preallocate blocks to a file and for file systems which support the fallocate system call, this is done quickly by allocating blocks and marking them as uninitialized, requiring no I/O to the data blocks.) Punching holes is accomplished by using fallocate( ) command with mode=FALLOC_FL_PUNCH_HOLE). In one embodiment, "hole punched" files keep their original file size (as the default mode is ALLOC_FL_KEEP_SIZE). By keeping the original file size, the present invention converts a thick file (as compared to thin file provisioning) into a sparse file. An empty [sparse] file consumes no blocks and is safe for deletion. Punching holes in a file returns the free space to the FS (e.g., not the block-device, which is proper since that is the level at which the deduplication appliances function, operate, and/or work). It should be noted though however that one challenge and/or limitation in the defragmenting-less hole-punching technique, which is that any hole smaller than the FS block-size (usually 4 KB) is not usable by the FS and is not considered to add to the FS free space. For instance one can have pathological case where more than 99% of a file "punched" in 4096 granularity (e.g., a minimum file size—sector and/or less than the FS page size, which in this case is assumed to be 4K) and yet, it will not free a single byte to the FS. The in-house defrag on the other hand can consolidate those many small fragments and make use of the resultant space.

In one embodiment, when using the hole-punching, files system performance is improved for an application. For example, assume there a multithreaded application that creates large files (many gigabytes per file). The application sometimes wants to punch holes on at least 1 megabyte in size). On certain applications (e.g., Redhat 6), the measured time that punching holes requires about 2 ms. For example, in one type of kernel (e.g., IBM® 3.8-rcl kernel) a hole punch is performed in well under 2 ms (e.g., at least 10,000 hole punches being done in ~300 ms). In other words, in this example there may be roughly 300 ms/10000=30 uS per hole punch call. This result is achieved with the fallocate command.

In one embodiment, the hole punching is serialized the same way as truncation—all concurrent operations to the same file are locked out while the hole punch is performed. Operations to other files will be unaffected unless they are trying to allocate and/or free extents in the same allocation group, or a user is running a kernel that does synchronous transactions and the other operations serialize on the synchronous transaction commits.

In one embodiment, the present invention provides a solution for comparing overhead for a defragmentation to the overhead of the hole-punching to determine which of the solutions is performing better. The present invention determines whether a FS is stable enough to rely on the "hole-punching" technique. Since "hole-punching" is much simpler than defragmentation and increases performance reliably, the present invention defaults to the hole punching technique if it is unable to determine which operation (e.g., defragmentation and/or hole punching) will make the deduplication appliances faster and experience increased efficiency.

For example, in comparing the defragmentation technique with defrag-less technique (e.g., the hole punching), the following testing setup and methods may be used. 1) The unit under test is a 1 gigabyte (GB) file. 2) A single thread is used for the [simulated] defragmentation. 3) A genesis 200 file (UUT) file (e.g., .UUT file) consists of interchanged 4K 'a' and 4K 'b' blocks like: abababababa, i.e., extremely fragmented file. 4) The defragmentation moves the 'a' blocks starting from the tail of the 1 GB over the 'b' blocks starting from the head of the 1 GB. In the case of the example above the ababababa will turn into aaaaababa. In this case only a→a and a→a were moved. Thus, in the bigger picture, only 0.25 GB of the whole 1 GB is being moved during the defrag exercise. 5) Test Application type. For example, in one embodiment three types of FS's which support hole-punching were tested: EXT4, XFS and BTRFS. The reason being is to find whether all three FS system despite their various virtual layer implementations, show consistent results. The most robust of all FS was the EXT4 followed by the XFS and last was the BTRFS. There were differences in the actual performance number and behavior of the three FS but the results seem to be consistent. Upon addressing the results consistency question, the rest of the tests were conducted on the EXT4 FS alone, as it is the most stable and also uses extents as the gfs2 FS does, where there is nothing to preclude the gfs2 FS from using the hole-punching. 6) Apply at least one or more defragmentation methods. For example, in one embodiment, at least three defragmentation methods may be attempted: A) lseek (to_source), read(source), lseek(to_where_to_write), write (target) in a tight loop. B) Use mmap( ) of the 1 GB into memory and memcpy( ), msync( ) every single copied 4K. C) Use mmap( ) of the 1 GB into memory and memcpy( ) but, msync( ) just once at the end of the whole process. The msync( ) however was for 0.5 GB that covers old and new 4K blocks. After performing the tests using all three methods, one or more other types of defragmentation methods may be applied to the rest of the tests were using an alternative defragmentation method (e.g., the LSEEK methodology) assuming that in actual application one cannot memory-map too many 1 GB files for the purpose of defragging them because, it will decrease the deduplication performance. 7) For the defrag-less solution (e.g., hole punching) there a need is created to free space which is made of enough space yet a very fragmented space. To that end, for example, a FS may be completely full (i.e 100% full). Then using the fallocate command one or more scenarios may be tested (e.g., such as three scenarios tested: 1) Every even 4 k block was hole-punched, 2) Every even 16 k block was hole-punched, and 3) Every even 32K block was hole-punched. Then for each scenario, a new 1 GB file may be created/copied. In the case of certain types of FS's (e.g., EXT4 FS) the utility debugfs→show_inode_info may be used to verify that the new file extents were made of 4 k/16 k/32 k block(s) respectively. 8) Before each test is carried out the cache may be cleared (e.g., the virtual machine (VM) machine (CENTOS)).

Figure 3:
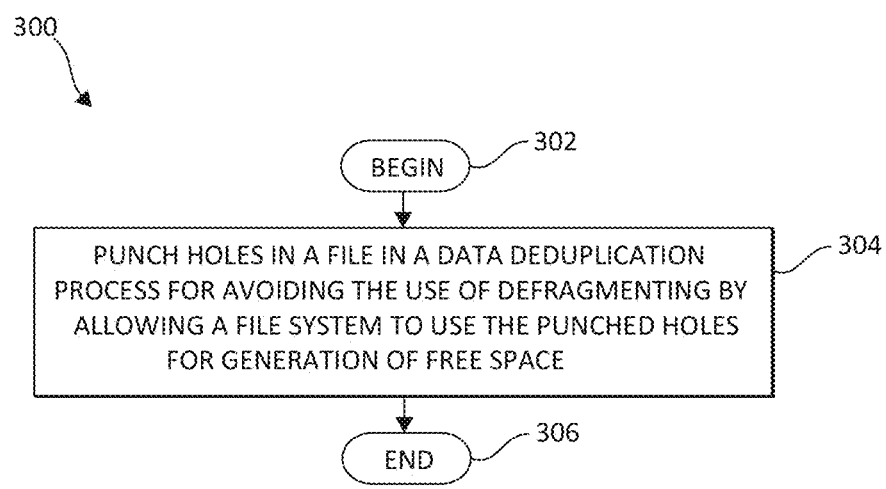
FIG. 3 a flowchart illustrating an exemplary method for defragmentation-less deduplication in which aspects of the present invention may be realized.

FIG. 3 a flowchart illustrating an exemplary method 300 for defragmentation-less deduplication in which aspects of the present invention may be realized. The method 300 begins (step 302), for defragmentation-less deduplication, punching holes in a file in a data deduplication process for avoiding the use of defragmenting by allowing a file system to use the punched holes for reclaiming the hole space for adding to a free space pool of the file system (step 304). In other words, the method punch holes where the fragments were. In doing so the method 300 returns the fragments to a file system. The fragments may be reused if and only if they are at least of the file system page-size, which may be a configurable. The method 300 ends (step 306).

Figure 4:
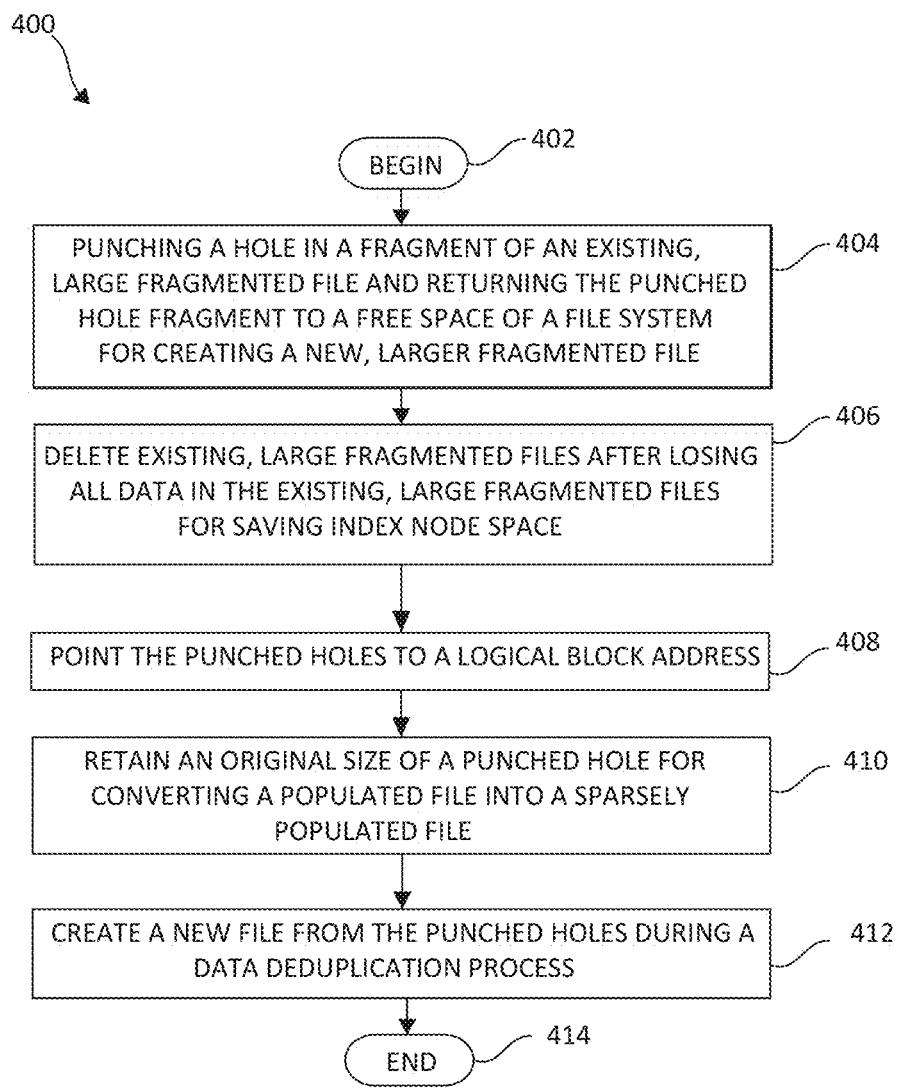
FIG. 4 a flowchart illustrating an exemplary additional method for defragmentation-less deduplication in which aspects of the present invention may be realized.

Turning now to FIG. 4, a flowchart illustrating an exemplary additional method 400 for defragmentation-less deduplication is depicted. The method 400 begins (step 402) by punching a hole in a fragment of an existing, large fragmented file and returning the punch hole fragment to the free space of the file system for creating a new, larger fragmented file (step 404). It should be noted that the term large may be in defined a size larger than a predefined size according to a user preference and/or by a comparison to other files. Such application also applies throughout the description for the term small and may be defined by a size smaller than a predefined size according to a user preference and/or by a comparison to other files. A fallocate command is used for the hole punching. Existing, large fragmented files are deleted after losing all data in the existing, large fragmented files for saving index node space (step 406). The punched holes point to a logical block address (LBA) zero (step 408). The method 400 retains an original size of a punched hole for converting a populated file into a sparsely populated file (step 410). A new file is created from the punched holes during the data deduplication process and/or a new file can be created using the free space which is made of no fragmented and/or some fragmented space chunks (step 412). The method 400 ends (step 414).

In one embodiment, the present invention creates a number of 1 gigabyte (GB) files on a fresh (new) file system (FS) to determine/see a best time it takes to create a file where the FS has no fragments. In one embodiment, once it is determined that the best time is at or about a 25 seconds range to create each 1 GB file the present invention moves on to a second, additional step. The second step sets up a test environment so that the FS free space is a fragmented one. To that end, the present invention uses the hole-punching to make those fragments. In a final step, the present invention asks (e.g., requests) the FS to create a new file using the file system's free space, which we forced to be a fragmented one, and measures the time it takes the FS to create a 0.5 GB. It one embodiment, the present invention request on or about 15 seconds to create the 0.5 GB.

Consider now several examples and scenarios illustrated the hole punching and presented, illustrated as extreme case, where all fragments are 4 KB each. In one embodiment, creating a 1 GB file using 4 KB fragments takes about 6 minutes compared to merely 28 seconds when the FS is un-fragmented. Testing the defrag-less approach with larger [average] fragment size shows a major improvement in the performance. Using 32 KB fragments the time to create a 1 GB file was in the same ball-park as the creation of a 1 GB file with a new FS. Reading a file that consists of many [small] extents will also take longer than reading a file of comparable size, which is built with small number of big extents. Reading of "condensed" 1 GB took about 11 seconds and reading a 1 GB "none-compacted" file took about 30 seconds (in both cases the reads were redirected to the /dev/null). Reading the file however, should not be a major concern as those files are read mostly when recovery is done of the backup and this is a rather rare and then time of recovery is less important than the ability to recover the sought after data.

Consider now File-System using a fragment size of 4 KB (e.g., using FS's EXT4, XFS, and BTRFS). In one embodiment, a time to copy of 1 GB file when the FS is un-fragmented is 24 seconds for EXT4, 28 seconds for XFS, and 25 seconds for BTRFS. In one embodiment, a time to defragment 0.25 GB out of the 1 GB where each 4 k is msynced( ) is 30 minutes for EXT4, 36 minutes for XFS, 88 minutes for BTRFS. In one embodiment, a time to defragment 0.25 GB out of the 1 GB where on msync( ) of 0.5 GB is done at the end is 3 minutes for EXT4, 4 minutes for XFS, 1 minutes for BTRFS. In one embodiment, a time to lseek( ), read( ), lseek( ), write( ) for 0.25 GB out of the 1 GB is 7 minutes for EXT4, 5 minutes for XFS, 4 minutes for BTRFS. In one embodiment, a time to create a 0.5 GB file made of many 4 k block extents is 3 minutes for EXT4, 8 minutes for XFS, 1 minutes for BTRFS.

Such data illustrates, as expected, that creating a file on an un-fragmented FS is by far the fastest. However, handling of files in a populated FS using defragmentation instead of letting the FS layer handle the files operation is not be the best method. The results clearly show that defrag-less deduplication is feasible as its performance is not lagging behind the defragmentation methods. Bearing in mind that in the case of the defragmentation, only the defragmentation time was measured and meaningful data has yet to be created. Also, the time to calculate and update the new references has to be added.

Turning now to FIGS. 5-7, a detailed report and explanation of the work done to validate the feasibility of the defrag-less deduplication solution is provided by several test case scenarios showing file system extent maps and output results.

FIG. 5 is a test result diagram 500 illustrating an exemplary a 1 gigabyte (GB) file created on a new file system extent map in which aspects of the present invention may be realized. As will be appreciated by one of ordinary skill in the art, aspects of present invention are illustrated and displayed using file extents map layout. FIG. 5 illustrates an example of the time it takes to create a 1 GB file on a fresh file-system and is uses as a base line (e.g., it represents the fastest possible time to create a file as, the FS has no fragments to skip). FIG. 5 illustrates what a 1 GB file created on a fresh (new) FS looks like in terms of its extents. FIG. 5 illustrates the layout of a 1 GB file on a fresh (new) FS and illustrates that the number of total chunks are relatively small and no defragment-less technique is used to create the file. Here it is observed that it is more or less one/very-few contiguous chunks of data.

FIG. 5 illustrates the feasibility of the embodiments described herein and shows that the time it takes to create a contiguous file using the defragmentation-less deduplication is about the same as creating the same files size using fragments. Here, as observed in FIG. 5, a 1 GB file that was created on a fresh FS extent maps is observed. All chunks (though they are listed as 32 k each) are contiguous.

FIG. 6 is a test result diagram 600 illustrating additional exemplary six 1 gigabyte files created on an EXT4 file system extent map having only 5.2 gigabyte (GB) available in which aspects of the embodiments described herein may be realized. As will be appreciated by one of ordinary skill in the art, aspects of embodiments described herein are illustrated and displayed using file extents map layout. FIG. 6 illustrates and gives the time it takes to create each of the 5 1 GB files. As observed, it takes around 25 seconds for each of the 5 1 GB files. All those files were created on an FS without fragments. It should be noted that the last file is smaller than the 1 GB because the embodiments described herein filled out the FS. FIG. 6 shows that creating 1 GB files take around 25 seconds on an un-fragmented FS. An attempt is shown to create 6 1 GB file on the EXT4 FS, which has only 5.2 GB available. The 'real' time in FIG. 6 is the wall-time it took to create each of the files. As illustrated, it takes around twenty four seconds (e.g., 24 s) for each of the first 5 files (which do reach the 1 GB size). In one embodiment, by way of example only, the embodiments described herein ignore the last partial file. So, the test shows that it takes about 24 seconds to create a 1 GB file on any particular FS. FIG. 6 start with a fresh FS and as many as possible 1 GB files are created on that FS. As the whole FS is just 5.2 GB, only the first 5 files actually are 1 GB each. The last file is truncated midway as the FS runs out of space. At the end of this process, the FS is full and there is no room to create even the smallest file and there is no hole punching used during this phase. Thus, it is observed that on average creating a 1 GB file took about 25 seconds. Turning now to FIG. 7, it is now time to fake/create the fragments/holes (using the fallocate( ) routine).

FIG. 7 is a test result diagram 700 illustrating additional exemplary 1 Gaba.new6 file, which created on a file system extent map filling the entire file system using defragmentation-less deduplication in which aspects of the embodiments described herein may be realized. It should be noted that the creation of the file does not employ the defragment-less technique. Rather, the defragment-less technique (e.g., the hole punching) was used to create the fragments that were added (in fact the entire free space is made of the fragments and prior to that the free space was ZERO) to the FS free space pool. Once the embodiments prepared the scene with a fragmented FS the creation time of the file on the FS at this time had to be the time to create the 0.5 GB on those many fragments. In FIG. 7, it is observed that the time it takes to create a 0.5 GB file, which is made of all the FS fragments. Each of the fragments is large enough (e.g., larger than the FS page size). At the bottom of the screen shot of FIG. 7, the file extent map is displayed which shows all of the fragments. The map is truncated, for purposes of illustration, given the length and brevity, but FIG. 7 provides enough information about the file map nature being built on to of many fragments (as expected). As will be appreciated by one of ordinary skill in the art, aspects of are illustrated and displayed using file extents map layout. Creating 1Gaba.new6 file that fills the FS to the hilt (e.g., 0.5 GB) is displayed. This operation, using the defragmentation-less deduplication, takes about 15 seconds. FIG. 7 shows that creating 0.5 GB files in a fragmented FS takes about 15 seconds (e.g., it is similar as creating a file in an un-fragmented FS). In FIG. 7, the embodiments described herein use the above hole punching to create the fragments. The total size of all fragments came to 0.5 GB in that exercise. Now, requests are sent the FS to create a new file (knowing that it will have to create the file using those scattered holes/fragments it is left it with). Here it is observed that it took 15 seconds to create the 0.5 GB file (which means it would have taken about 30 seconds to create a 1 GB file is the FS had enough fragments). Thus, the embodiments described herein illustrates in FIG. 7 that the FS can be as efficient if not more than having to run a defrag first and then to create the new file.

In order to compare "defragmentation-less deduplication with defragmentation" the present invention needs to consider the defragmentation time that has to be added to the time it takes to create a file in an un-fragmented FS. A quick extrapolation shows that it would have taken around 28 seconds to create a new file if the average fragment is 32K (e.g., very close to the time it takes to create a 1 GB file on a fresh FS.) Simulation of defrag-less using mix of fragments sizes: 0.25 G of each: 64 KB, 32 KB, 16 KB, 8 KB and 4 KB.

In one embodiment, a file system (e.g., the EXT4 FS) picks up the fragments it uses without any optimization (e.g., if it finds a 4 KB fragment first it will use it and not look for a better fit). Thus, smaller holes (e.g., relative to other holes in a file) are made in the files that occupy the head of the FS and larger holes (e.g., relative to other holes in a file) on files that reside at the tail of the FS. Thus, the time to create a new 1 GB file is about 5 minutes, while if the embodiments described herein change the order and it find the larger holes first, to satisfy most of the file requirements (leaving many small fragments in the free map), the time to create a 1 GB file was less than a minute. If the fragments are randomly spread across the FS space then the speed to file creation will be proportional to the number of fragments used. The more fragments are used the longer it will take to create a file.

Also, the difference in the time can be attributed greatly to the number of operations (e.g., 64K versus 8K) where the 64K data movements may take about 13 times longer than the 8K movements (of the larger data chunks/fragments). In one embodiment, holes are punched in an existing file and a new file is created using the holes/fragments. In one embodiment, first, holes are punched in an exiting file. As may be illustrated in the above Fig.'s, file extent maps are illustrated after it was systematically punched on every other 4K blocks. In one embodiment, a file "size" remains unchanged, however, the number of the size is only smaller compared to the original size of blocks (e.g., half of the file space was freed). The 'df-h.' confirmed that 0.5 is free in the FS (the difference between the FS total NET size of 9.9 G and the used space of 9.4 G. In one embodiment, the present invention may also verify the actual available free space at a predetermined point in time by creating a new file and check its size once.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium (e.g., non-transitory computer readable storage medium) may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for defragmentation-less deduplication using a processor device, comprising:
upon performing a data deduplication process, punching holes in a fragment of an existing fragmented file to increase performance of a deduplication appliance executing the data deduplication process, the punching holes allowing a file system of the deduplication appliance to use the punched holes for reclaiming free space for adding to a free space pool of the file system; wherein the punching holes is performed in lieu of performing a defragmenting operation on the existing fragmented file and is performed as a default operation during the data deduplication process; and
upon performance of the punching holes, creating a new file from the punched holes during the data deduplication process.

2. The method of claim 1, further including punching a hole in a fragment of an existing, large fragmented file and returning the punch hole fragment to the free space of the file system for creating a new, larger fragmented file.

3. The method of claim 1, further including deleting existing, large fragmented files after losing all data in the existing, large fragmented files for saving index node space.

4. The method of claim 3, further including pointing the punched holes to a logical block address (LBA) zero.

5. The method of claim 1, further including retaining an original size of a punched hole for converting a populated file into a sparsely populated file.

6. The method of claim 1, further including using a fallocate command for the hole punching.

7. A system for defragmentation-less deduplication in a computing environment, comprising:
a processor device, operable in the computing environment, wherein the processor device:
upon performing a data deduplication process, punches holes in a fragment of an existing fragmented file or a defragmenting operation will result in to increase performance of a deduplication appliance executing the data deduplication process, the punching holes allowing a file system of the deduplication appliance to use the punched holes for reclaiming free space for adding to a free space pool of the file system; wherein the punching holes is performed in lieu of performing a defragmenting operation on the existing fragmented file and is performed as a default operation during the data deduplication process; and
upon performance of the punching holes, creates a new file from the punched holes during the data deduplication process.

8. The system of claim 7, wherein the processor device punches a hole in a fragment of an existing, large fragmented file and returning the punch hole fragment to the free space of the file system for creating a new, larger fragmented file.

9. The system of claim 7, wherein the processor device deletes existing, large fragmented files after losing all data in the existing, large fragmented files for saving index node space.

10. The system of claim 7, wherein the processor device points the punched holes to a logical block address (LBA) zero.

11. The system of claim 7, wherein the processor device retains an original size of a punched hole for converting a populated file into a sparsely populated file.

12. The system of claim 7, wherein the processor device uses a fallocate command for the hole punching.

13. A computer program product for applying a content defined minimum size bound on content defined blocks using a processor device in a computing environment, the computer program product comprising a non-transitory computer-readable storage medium having computer-readable program code portions stored therein, the computer-readable program code portions comprising:
a first executable portion that, upon performing a data deduplication process, punches holes in a fragment of an existing fragmented file to increase performance of a deduplication appliance executing the data deduplication process, the punching holes allowing a file system of the deduplication appliance to use the punched holes for reclaiming free space for adding to a free space pool of the file system; wherein the punching holes is performed in lieu of performing a defragmenting operation on the existing fragmented file and is performed as a default operation during the data deduplication process; and
upon performance of the punching holes, creates a new file from the punched holes during the data deduplication process.

14. The computer program product of claim 13, further including a second executable portion that punches a hole in a fragment of an existing, large fragmented file and returning the punch hole fragment to the free space of the file system for creating a new, larger fragmented file.

15. The computer program product of claim 13, further including a second executable portion that deletes existing, large fragmented files after losing all data in the existing, large fragmented files for saving index node space.

16. The computer program product of claim 13, further including a second executable portion that points the punched holes to a logical block address (LBA) zero.

17. The computer program product of claim 13, further including a second executable portion that:
retains an original size of a punched hole for converting a populated file into a sparsely populated file, and
uses a fallocate command for the hole punching.

* * * * *